(12) United States Patent
Benjamin et al.

(10) Patent No.: US 10,156,672 B2
(45) Date of Patent: Dec. 18, 2018

(54) DOUBLE CLAD LIGHT DIFFUSING FIBER, CONNECTOR SYSTEM AND ILLUMINAIRE

(71) Applicant: Corning Incorporated, Corning, NY (US)

(72) Inventors: Seldon David Benjamin, Spring, TX (US); Kevin Wallace Bennett, Hammondsport, NY (US)

(73) Assignee: CORNING INCORPORATED, Corning, NY (US)

( * ) Notice: Subject to any disclaimer, the term of this patent is extended or adjusted under 35 U.S.C. 154(b) by 445 days.

(21) Appl. No.: 14/919,195

(22) Filed: Oct. 21, 2015

(65) Prior Publication Data

US 2016/0116660 A1    Apr. 28, 2016

Related U.S. Application Data

(60) Provisional application No. 62/067,017, filed on Oct. 22, 2014.

(51) Int. Cl.
*G02B 6/02*    (2006.01)
*G02B 6/36*    (2006.01)
(Continued)

(52) U.S. Cl.
CPC ........... *G02B 6/0006* (2013.01); *G02B 6/001* (2013.01); *G02B 6/0229* (2013.01);
(Continued)

(58) Field of Classification Search
CPC .............................. G02B 6/001; G02B 6/0229
See application file for complete search history.

(56) References Cited

U.S. PATENT DOCUMENTS 7,215,860 B2 *  5/2007  Engelberth .............. G02B 6/02
                                                      385/127
8,545,076 B2   10/2013  Bickham et al.
(Continued)

FOREIGN PATENT DOCUMENTS

CN         102650717 A      8/2012

OTHER PUBLICATIONS

International Search Report and Written Opinion of the International Searching Authority; PCT/US2015/056544; dated Feb. 15, 2016; 13 Pages.
(Continued)

*Primary Examiner* — Omar R Rojas (57) ABSTRACT

The present invention is directed to an optical fiber that includes a glass core region that has nano-sized structures configured to scatter light propagating in the glass core region. The glass core region has an average refractive index $n_{avg}$. The fiber includes an interior glass cladding region that has an interior cladding refractive index $n_2$ that is less than $n_{avg}$. The fiber includes an outer cladding region that has an outer cladding refractive index $n_3$ that is less than $n_2$. A refractive index difference of $n_2-n_3$ corresponds to a bend uniformity diameter; the light exiting the outer cladding at a fiber bending location is substantially non-uniform when a bending diameter of the fiber bending location is less than the bend uniformity diameter.

9 Claims, 5 Drawing Sheets

(51) Int. Cl.
    *F21V 8/00*      (2006.01)
    *G02B 6/036*    (2006.01)
    *G02B 6/245*    (2006.01)
    *G02B 6/38*      (2006.01)
(52) U.S. Cl.
    CPC ..... *G02B 6/02033* (2013.01); *G02B 6/02338* (2013.01); *G02B 6/02357* (2013.01); *G02B 6/02395* (2013.01); *G02B 6/03633* (2013.01); *G02B 6/03661* (2013.01); *G02B 6/245* (2013.01); *G02B 6/02295* (2013.01); *G02B 6/3861* (2013.01)

(56) References Cited

U.S. PATENT DOCUMENTS

| | | |
|---|---|---|
| 2007/0179485 A1 | 8/2007 | Yeik et al. |
| 2009/0074361 A1 | 3/2009 | Pimpinella et al. |
| 2013/0088888 A1* | 4/2013 | Fewkes .................. G02B 6/001 362/558 |

OTHER PUBLICATIONS

Nishimoto et al; "High-Na, Wide-Band, Hard-Clad PCF"; Sumitomo Electric Technical Review, Osaka, JP, No. 31, Jan. 1, 1991, pp. 64-70; ISSN 0376-1207.

Tokoro et al; "Sustainable UV-Curable Low Refractive Index Resins With Novel Polymers for Polymer Cladding Materials"; Proc. of SPIE, vol. 8983; 89831O-1-89831O-6, 2014.

Logunov et al; "Light-Diffusing Optical Fiber Having Nanostructured Inner and Outer Core Regions"; U.S. Appl. No. 14/919,034, filed Oct. 21, 2015.

* cited by examiner

DOUBLE CLAD LIGHT DIFFUSING FIBER, CONNECTOR SYSTEM AND ILLUMINAIRE

CROSS-REFERENCE TO RELATED APPLICATIONS

This application claims the benefit of priority under 35 U.S.C. § 119 of U.S. Provisional Application Ser. No. 62/067,017 filed on Oct. 22, 2014, the content of which is relied upon and incorporated herein by reference in its entirety.

BACKGROUND

Field of the Invention

The present specification generally relates to light-diffusing optical fibers for use in illumination applications and, more specifically, to light-diffusing optical fibers capable of producing color movement along the length of the fiber.

Background

Optical fibers are used for a variety of applications where light needs to be delivered from a light source to a remote location. Optical telecommunication systems, for example, rely on a network of optical fibers to transmit light from a service provider to system end-users.

Telecommunication optical fibers are designed to operate at near-infrared wavelengths in the range from 800 nm to 1675 nm where there are only relatively low levels of attenuation due to absorption and scattering. This allows most of the light injected into one end of the fiber to exit the opposite end of the fiber with only insubstantial amounts exiting peripherally through the sides of the fiber.

Recently, however, there has been a growing need to have optical fibers that are less sensitive to bending than conventional fibers. This is because more and more telecommunication systems are being deployed in configurations that require the optical fiber to be tightly bent. This need has led to the development of optical fibers that utilize a ring of small, non-periodically disposed voids that surround the core region. The void containing ring serves to increase the bend insensitivity—that is to say, the fiber can have a smaller bend radius without suffering a significant change in the attenuation of the optical signal propagating in the fiber. Optical losses are minimized by placing the void containing ring region in the cladding of the optical fiber (some distance from the core); thus, the amount of light propagating through void containing ring region is minimized.

Because optical fibers are typically designed to efficiently deliver light from one end of the fiber to the other end of the fiber over long distances, very little light escapes from the sides of the typical fiber, and, therefore optical fibers are not considered to be well-suited for use in forming an extended illumination source. Yet, there are a number of applications such as special lighting, signage, or biological applications, including bacteria growth and the production of photobioenergy and biomass fuels, where select amounts of light need to be provided in an efficient manner to the specified areas. For biomass growth there is a need to develop processes that convert light energy into biomass-based fuels. For special lighting the light source needs to be thin, flexible, and easily modified to variety of different shapes.

Light diffusing fibers are important for applications such as specialty lighting, signage and display applications where selected amounts of light are required to be provided to the specified areas in an efficient manner. In one approach that was considered, nano-engineered features were formed in optical fibers to implement scattering centers configured to provide very efficient scattering of light through the sides of the optical fiber. The optical fibers and the scattering mechanisms formed in the fiber provide a very small, flexible illumination source. These optical fibers can also be bundled together to effectively increase the core size in order to more effectively couple light from an LED or similar light sources. The extraction of light from the fiber is generally uniform and may be tuned to scatter more or less light through the sides by controlling the number of scattering sites within the fiber.

Light diffusing fibers with scattering centers both in the core and the clad have been disclosed. In some embodiments, the light diffusing fiber comprises a silica core in which a section of the core contains a ring of non-periodically distributed (radially and axially) nano-engineered features acting as scattering sites. The scattering sites have diameters in the ~50-500 nm range and lengths of ~10-1000 mm. Since the scattering centers range in size from 50-500 nm, they effectively scatter the propagating light almost independent of the wavelength of the light used. The magnitude of scattered light is controlled by exploiting its dependence on the size of the scattering centers and their relative area compared to the fiber core. The absorption losses within the fiber are negligible, and the scattering losses can be as high as 5-10 dB/m. The clad of the fiber can be either F-doped silica or low index polymer clad, giving NA of the fiber up to 0.53. The bending losses are also small with minimum bending diameters as small as a 5 mm radius. One of the issues with aforementioned optical fibers relates to type of optical connectors that are suitable for use with a particular optical fiber.

For example, the F-doped silica clad fibers can be configured to be compatible with conventional fiber optic connector technologies. Stated differently, because the glass cladding is intimately connected to the ceramic ferrule, the strain relief of the fiber to the ferrule is relatively high and a high core to ferrule concentricity is more easily achieved. However, the NA achievable for conventional F-doped silica clad fibers does not allow for uniform illumination when the fiber is under bend. On the other hand, it is more problematic to use conventional fiber optic connector technologies with optical fibers that feature a low index polymer cladding. Optical fibers with low index polymer cladding must be installed with the connector with the cladding intact; and connectors of this type are commonly referred to as "crimp and cleave" fiber connectors. To be specific, the connector components are directly crimped onto the relatively soft polymer coating of the fiber, but the connector is not able to achieve physical contact because the fiber enfaces flatten against each other. Moreover, the strain relief of the fiber to the ferrule is much lower. Finally, high core to ferrule concentricity is not easily achieved due to imprecise low index coating thickness and centering. Briefly stated, when comparing polymer clad fibers to glass clad fibers, the polymer clad fibers achieve inferior results. Accordingly, the cost of terminating polymer clad fiber is relatively high because it cannot use a standard optical fiber ferrule connector.

What is needed therefore is an F-doped silica clad fiber that can be employed with a standard optical fiber ferrule connector while providing relatively uniform illumination in regions under bend.

SUMMARY

The present invention addresses the needs described above by providing an F-doped silica clad fiber that can be employed with a standard optical fiber ferrule connector while providing relatively uniform illumination in regions under bend.

One aspect of the present invention is directed to an optical fiber that includes a glass core region that has a first end and a second end and characterized by a core radius. The glass core region includes at least one nano-structured region disposed within at least one predetermined radial segment between the first end and the second end. The at least one nano-structured region includes nano-sized structures configured to scatter light propagating in the glass core region such that the glass core region has an average refractive index $n_{avg}$. The at least one nano-structured region is characterized by a nano-structured region radius that is less than or equal to the core radius. An interior glass cladding region surrounds the glass core region, the interior glass cladding region having an interior cladding refractive index $n_2$ that is less than $n_{avg}$. An outer cladding region surrounds the interior glass cladding region, the outer cladding region having an outer cladding refractive index $n_3$ that is less than $n_2$. A refractive index difference of $n_2-n_3$ corresponds to a bend uniformity diameter, wherein the light exiting the outer cladding at a fiber bending location is substantially non-uniform when a bending diameter of the fiber bending location is less than the bend uniformity diameter.

In one embodiment, a diameter of the glass core region and the interior glass cladding region is substantially equal to about 125 µm.

In one embodiment, a cross-section of the at least one nano-structured region is substantially circular, an origin of the substantially circular cross-section substantially corresponding to a central longitudinal axis of the optical fiber.

In one version of the embodiment, the at least one predetermined radial segment is substantially equal to the core radius.

In one version of the embodiment, the at least one predetermined radial segment is substantially less than the core radius.

In one embodiment, the at least one predetermined radial segment is substantially less than the core radius, a cross-section of the at least one nano-structured region being characterized as an annular ring disposed around a first portion of the glass core region, the first portion not including nano-sized structures.

In one version of the embodiment, the annular ring is disposed between the first portion and a second portion of the glass core region that does not include nano-sized structures.

In one embodiment, the interior glass cladding region is doped with Fluorine.

In one embodiment, the outer cladding region is comprised of a polymeric material.

In one version of the embodiment, the polymeric material is selected from a group of polymeric materials that include a Fluorine doped acrylate material, a silicone material, or a Teflon material.

In one embodiment, the fiber is characterized by a scattering-induced attenuation substantially within a range between 50 dB/km and 5,000 dB/km at a wavelength of the light.

In another aspect, the present invention is directed to a method that includes the step of providing an optical fiber that includes a glass core region having a first end and a second end characterized by a core radius. The glass core region includes at least one nano-structured region disposed within at least one predetermined radial segment between the first end and the second end. The at least one nano-structured region includes nano-sized structures configured to scatter light propagating in the glass core region such that the glass core region has an average refractive index $n_{avg}$. The at least one nano-structured region is characterized by a nano-structured region radius that is less than or equal to the core radius. The optical fiber also includes an interior glass cladding region that surrounds the glass core region. The interior glass cladding region has an interior cladding refractive index $n_2$ that is less than $n_{avg}$. The optical fiber further includes an outer polymeric cladding region that surrounds the interior glass cladding region. The outer cladding region has an outer cladding refractive index $n_3$ that is less than $n_2$. A refractive index difference of $n_2-n_3$ corresponds to a bend uniformity diameter, wherein the light exiting the outer cladding at a fiber bending location is substantially non-uniform when a bending diameter of the fiber bending location is less than the bend uniformity diameter. The method includes the step of providing an optical fiber connector that includes a ferrule portion having a ferrule bore length. A portion of the outer polymeric cladding region is removed. The portion of the outer cladding region has a length substantially corresponding to the ferrule bore length. A portion of the optical fiber is inserted a predetermined distance into the ferrule bore, the predetermined distance substantially corresponds to the length of the removed portion of the outer polymer cladding region such that only the glass core region and the interior glass cladding region are disposed within the ferrule.

In one embodiment, a curable epoxy is inserted into the ferrule bore to secure the portion of the optical fiber within the ferrule bore.

In one embodiment, a diameter of the glass core region and the interior glass cladding region is substantially equal to about 125 µm.

In one embodiment, the interior glass cladding region is doped with Fluorine, and the polymeric material is selected from a group of polymeric materials that include a Fluorine doped acrylate material, a silicone material, or a Teflon material.

In yet another aspect, the present invention is directed to a luminaire that includes a light-scattering optical fiber that includes a glass core region having a first end and a second end and characterized by a core radius. The glass core region includes at least one nano-structured region disposed within at least one predetermined radial segment between the first end and the second end, the at least one nano-structured region including nano-sized structures configured to scatter light propagating in the glass core region. The glass core region has an average refractive index $n_{avg}$. The at least one nano-structured region is characterized by a nano-structured region radius that is less than or equal to the core radius. The fiber includes an interior glass cladding region surrounding the glass core region, the interior glass cladding region having an interior cladding refractive index $n_2$ that is less than $n_{avg}$. The fiber also includes an outer cladding region surrounding the interior glass cladding region, the outer polymer cladding region having an outer cladding refractive index $n_3$ less than $n_2$. A refractive index difference of $n_2-n_3$ corresponds to a bend uniformity diameter, wherein the light exiting the outer cladding at a fiber bending location is substantially non-uniform when a bending diameter of the fiber bending location is less than the bend uniformity diameter. The luminaire also includes a light source that is coupled to the optical fiber and configured to direct the light into the optical fiber, the light being scattered by the nano-sized structures and emitted via the outer polymer cladding region.

In one embodiment, an optical fiber connector is coupled to the optical fiber. The optical fiber connector includes a ferrule portion having a ferrule bore length. A portion of the optical fiber is disposed in the ferrule bore and secured therein with a curable epoxy. The portion of the optical fiber disposed within the ferrule bore has the outer cladding region removed from the optical fiber.

In one embodiment, a diameter of the glass core region and the interior glass cladding region is substantially equal to about 125 μm.

In one embodiment, the light is characterized by at least one wavelength substantially within a range between 200 nm and 2000 nm.

In one embodiment, the light source includes a least one LED.

As used herein for purposes of the present disclosure, terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

Definitions

In the description of the disclosure below, the following terms and phrases are used in connection to light-diffusing optical fibers having nano-sized structures. The "refractive index profile" is the relationship between the refractive index or the relative refractive index and the waveguide (fiber) radius. The "relative refractive index percent" is defined as $\Delta(r)\ \%=100\ [n(r)^2-n_{REF}^2]/2n(r)^2$, where $n(r)$ is the refractive index at radius r, unless otherwise specified. The relative refractive index percent is defined at 850 nm unless otherwise specified. In one aspect, the reference index $n_{REF}$ is silica glass with the refractive index of 1.452498 at 850 nm, in another aspect is the maximum refractive index of the cladding glass at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant" as used herein is considered to be a dopant which has a propensity to raise the refractive index relative to pure undoped $SiO_2$. The term "downdopant" as used herein is considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not down-dopants may be present in a region of an optical fiber having a negative relative refractive index.

The term "α-profile" or "alpha profile" as used herein refers to refers to a relative refractive index profile, expressed in terms of $\Delta(r)$ which is in units of "%", where r is radius, which follows the equation, $\Delta(r)=\Delta(r_o)(1-[|r-r_o|/(r_1-r_o)]^\alpha)$, where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

As used herein, the term "parabolic" therefore includes substantially parabolically shaped refractive index profiles which may vary slightly from an α value of 2.0 at one or more points in the core, as well as profiles with minor variations and/or a centerline dip. In some embodiments, α is greater than 1.5 and less than 2.5. In other embodiments, α is greater than 1.7 and less than 2.3. In yet other embodiments, α is between 1.8 and 2.3 when measured at 850 nm. In other embodiments, one or more segments of the refractive index profile have a substantially step index shape with an α value greater than 8. In other embodiments, α is greater than 10 or greater than 20, when measured at 850 nm.

The term "nano-structured fiber region" as used herein refers to describes the fiber having a region or area with a large number (greater than 50) of gas filled voids, or other nano-sized structures, e.g., more than 50, more than 100, or more than 200 voids in the cross-section of the fiber. The gas filled voids may contain, for example, $SO_2$, Kr, Ar, $CO_2$, $N_2$, $O_2$, or mixture thereof. The cross-sectional size (e.g., diameter) of nano-sized structures (e.g., voids) as described herein may vary from 10 nm to 1 μm (for example, 50 nm-500 nm), and the length may vary from 1 millimeter 50 meters (e.g., 2 mm to 5 meters, or 5 mm to 1 m range).

In standard single mode or multimode optical fibers, the losses at wavelengths less than 1300 nm are dominated by Rayleigh scattering. The Rayleigh scattering loss ($L_s$) is determined by the properties of the material and is typically about 20 dB/km for visible wavelengths (400-700 nm). Rayleigh scattering losses also have a strong wavelength dependence, which means that at least about 1 km to 2 km of the fiber is needed to dissipate more than 95% of the input light. Shorter lengths of such fiber would result in lower illumination efficiency, while using long lengths (1 km to 2 km, or more) can be more costly and can be difficult to manage. The long lengths of fiber, when used in a bioreactor or other illumination system, may be cumbersome to install.

In certain configurations of lighting applications it is desirable to use shorter lengths of fiber, for example, 1-100 meters, although lengths significantly shorter than 1 meter and significantly longer than 100 meters are possible. This arrangement requires an increase of scattering loss from the fiber, while being able to maintain good angular scattering properties (uniform dissipation of light away from the axis of the fiber) and good bending performance to avoid bright spots at fiber bends. A desirable attribute of at least some of the embodiments of present disclosure described herein is high illumination along the length of the fiber illuminator. Because the optical fiber is flexible, it allows a wide variety of the illumination shapes to be deployed. There are substantially no bright spots (due to elevated bend losses) at the bending points of the fiber, such that the illumination provided by the fiber does not vary by more than 30%. In some embodiments the illumination variation is less than 20% and sometimes less than 10%. For example, in at least some embodiments, the average scattering loss of the fiber is greater than 50 dB/km, and the scattering loss does not vary more than 30% (i.e., the scattering loss is within ±30% of the average scattering loss) over any given fiber segment of 0.2 m length. According to at least some embodiments, the average scattering loss of the fiber is greater than 50 dB/km, and the scattering loss does not vary more than 30% over the fiber segments of less than 0.05 m length. According to at least some embodiments, the average scattering loss of the fiber is greater than 50 dB/km, and the scattering loss does not vary more than 30% (i.e., ±30%) over the fiber segments 0.01 m length. According to at least some embodiments, the average scattering loss of the fiber is greater than 50 dB/km, and the scattering loss does not vary more than 20% (i.e., ±20%) and in some embodiments by not more than 10% (i.e., ±10%) over the fiber segments 0.01 m length.

In at least some embodiments, the intensity variation of the integrated (diffused) light intensity coming through sides of the fiber at the illumination wavelength is less than 30% for target length of the fiber, which can be, for example, 0.02-100 m length. It is noted that the intensity of integrated light intensity through sides of the fiber at a specified illumination wavelength can be varied by incorporating fluorescence material in the cladding or coating. The wavelength of the light scattering by the fluorescent material is different from the wavelength of the light propagating in the fiber.

In some the following exemplary embodiments there is described fiber designs with a nano-structured fiber region (region with nano-sized structures) placed in the core area of the fiber, or very close to core. Some of the fiber embodiments have scattering losses in excess of 50 dB/km (for example, greater than 100 dB/km, greater than 200 dB/km, greater than 500 dB/km, greater than 1000 dB/km, greater than 3000 dB/km, greater than 5000 dB/km), the scattering loss (and thus illumination, or light radiated by these fibers) is uniform in angular space.

In order to reduce or to eliminate bright spots as bends in the fiber, it is desirable that the increase in attenuation at a 90° bend in the fiber is less than 5 dB/turn (for example, less than 3 dB/turn, less than 2 dB/turn, less than 1 dB/turn) when the bend diameter is less than 50 mm. In an exemplary embodiment, the low bend losses are achieved at even smaller bend diameters, for example, less than 20 mm, less than 10 mm, and even less than 5 mm. The total increase in attenuation is less than 1 dB per 90 degree turn, at a bend radius of 5 mm.

According to some embodiments, the bending loss is equal to or is lower than intrinsic scattering loss from the core of the straight fiber. The intrinsic scattering is predominantly due to scattering from the nano-sized structures. Thus, according to at least the bend insensitive embodiments of optical fiber, the bend loss does not exceed the intrinsic scattering for the fiber. However, because the scattering level is a function of bending diameter, the bending deployment of the fiber depends on its scattering level. For example, in some of the embodiments, the fiber has a bend loss less than 3 dB/turn, and in some embodiments, less than 2 dB/turn, and the fiber can be bent in an arc with a radius as small as 5 mm radius without forming bright spots.

Also, in the description below, in some embodiments where it is said that scattered actinic light is provided or delivered throughout a photoreactive material, the scattered actinic light is assumed to have sufficient intensity to perform a photoreaction on the photoreactive material in a reasonable period of time.

These and other aspects of the invention will be apparent from and elucidated with reference to the embodiment(s) described hereinafter.

Additional features and advantages will be set forth in the detailed description which follows, and in part will be readily apparent to those skilled in the art from that description or recognized by practicing the embodiments as described herein, including the detailed description which follows, the claims, as well as the appended drawings. It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts. One embodiment of the double-clad light-diffusing fiber is shown in FIG. 1, and is designated generally throughout by the reference numeral 12.

Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

A method of the present invention includes the step of providing an optical fiber that includes a glass core region having a first end and a second end characterized by a core radius. The glass core region includes at least one nano-structured region disposed within at least one predetermined radial segment between the first end and the second end. The at least one nano-structured region includes nano-sized structures configured to scatter light propagating in the glass core region such that the glass core region has an average refractive index $n_{avg}$. The at least one nano-structured region is characterized by a nano-structured region radius that is less than or equal to the core radius. The optical fiber also includes an interior glass cladding region that surrounds the glass core region. The interior glass cladding region has an interior cladding refractive index $n_2$ that is less than $n_{avg}$. The optical fiber further includes an outer polymeric cladding region surrounding the interior glass cladding region. The outer cladding region is characterized by an outer cladding refractive index $n_3$ that is less than $n_2$; a refractive index difference of $n_2-n_3$ corresponding to a bend uniformity diameter, wherein the light exiting the outer cladding at a fiber bending location is substantially non-uniform when a bending diameter of the fiber bending location is less than the bend uniformity diameter. The method further includes the step of providing an optical fiber connector that includes a ferrule portion having a ferrule bore length. A portion of the outer polymeric cladding region is removed (the removed portion has a length substantially corresponding to the ferrule bore length) and the optical fiber is inserted into the ferrule bore a predetermined distance substantially corresponding to the length of the outer polymer cladding region removed from the optical fiber (so that only the glass core region and the interior glass cladding region are disposed within the ferrule).

Figure 1:
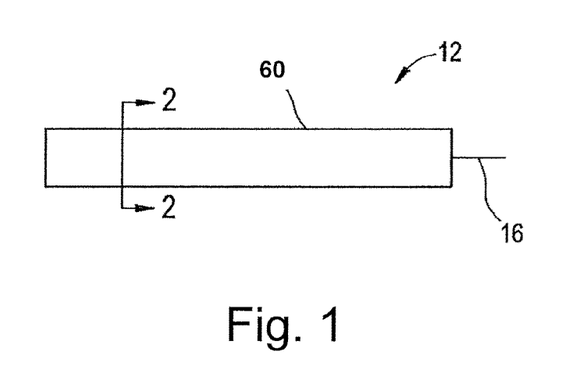
FIG. 1 is a schematic side view of a section of a double-clad light-diffusing optical fiber in accordance with an embodiment.

As embodied herein and depicted in FIG. 1, a schematic side view of a section of a light-diffusing optical fiber in accordance with an embodiment is disclosed. As described herein, a plurality of voids—or nano-particles—are disposed in the core of the double-clad light-diffusing optical fiber (hereinafter "fiber") 12 having a central axis ("centerline") 16. A double-clad region 40 ("cladding") surrounds the annular core 20 and has an outer surface or coating 60. The double-cladding 40 is characterized by a stepped refractive index, wherein the outer cladding 40-2 has a refractive index that is substantially lower than the inner cladding portion 40-1 in order to provide a high numerical aperture (NA) where NA is defined as $(n_{inner}^2-n_{outer}^2)^{0.5}$. See FIG. 2.

An optional coating 60 surrounds the double cladding 40. Those skilled in the art will appreciate that the term "cladding" refers to a material that is configured to confine the light to the core portion 20. To be clear, the cladding may also have other functions, but its primary function is to help guide and confine the light propagating in the fiber to the core region. As described herein, one or more coating(s) 60 may be applied over the cladding 40. Those skilled in the art will appreciate that the term "coating" differs from the term cladding in that a coating is typically used to protect the glass from external damage and that it may or may not have an optical function to either confine or remove the light propagating in the fiber to the core region 20 of the fiber 12.

In one embodiment, the coating 60 may include a low modulus primary coating layer and a high modulus secondary coating layer. In at least some embodiments, coating layer 60 can include a polymer coating such as an acrylate-based or silicone based polymer. In at least some embodiments, the coating has a constant diameter along the length of the fiber. In other embodiments, the coating 60 is configured to enhance the distribution and/or the nature of "radiated light" that passes through the double-cladding 40. The outer surface of the cladding 40 or the of the outer of optional coating 60 represents the "sides" of the fiber 12 through which light traveling in the fiber is made to exit via scattering, as described herein.

In some exemplary embodiments, coating 60 includes fluorescent or ultraviolet absorbing molecules that serve to modify radiated light. Suitable up or down converter molecules may also be included in the coating to produce light of differing wavelengths from that of the input light source. Ink coating layers may also be applied to alter the color or hue of the emitted light.

According to some embodiments, fibers 12 may be enclosed within a polymeric, metal, or glass covering (or coatings). The coating or covering has a minimum outer dimension (e.g., diameter) greater than 250 μm. If the fiber(s) has a metal coating, the metal coating may contain open sections, to allow light to be preferentially directed into a given area. A protective cover or sheath (not shown) optionally covers cladding 40 (or if coated, the optional coating 60).

Figure 2:
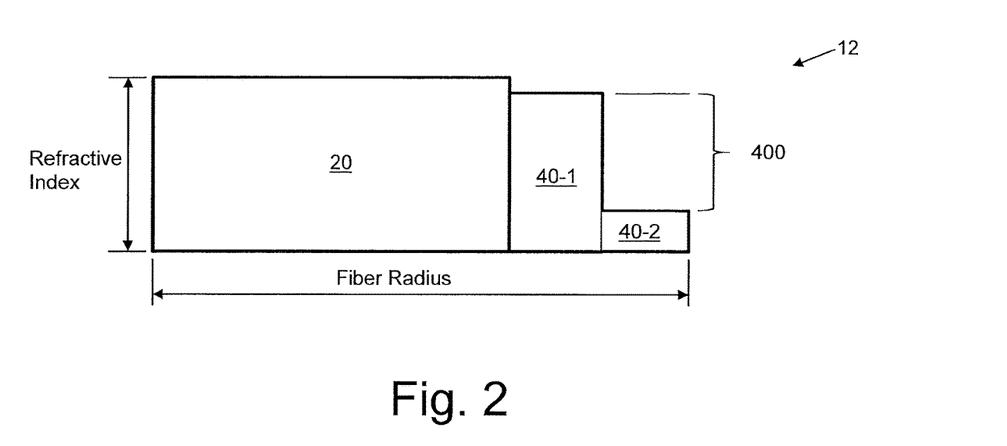
FIG. 2 is a schematic illustration of relative refractive index plot versus fiber radius for a double-clad light-diffusing fiber in accordance with an embodiment.

As embodied herein and depicted in FIG. 2, a schematic diagram of a double-clad light-diffusing fiber in accordance with the present invention is disclosed. The diagram is a plot showing the relative refractive index versus fiber radius. The center of the fiber is shown at the left-most edge of the diagram; the rightmost edge shows the extent of the outer cladding portion 40-2. The optical fiber includes therefore a core region 20, an inner cladding 40-1 and an outer cladding 40-2. As described herein, the glass core region includes one or more nano-structured regions 26 that are formed within the glass core region 20 (See, e.g., FIGS. 3, 4, 6A and 6B). The nano-structured regions 26 include nano-sized structures 31 that are configured to scatter light propagating in the glass core region. Thus, the glass core region may have an average refractive index that is a function of both the nano-structured regions and the non-light scattering regions. The refractive index difference 400 between the inner clad 40-1 and the outer clad 40-2 relates to the "bend uniformity" of the optical fiber. Bend uniformity refers to a substantially uniform emission of light via the outer cladding 40-2 at the bend location. The present invention optimizes the refractive index difference 400 in order to effectively confine light at a bending location to the glass core portion of the fiber for a predetermined bend uniformity diameter. For example, a relatively small refractive index difference 400 (i.e., that results in an NA≤0.2) will provide a bend uniformity for optical fiber bends greater than about 30 mm diameter, whereas a relatively large difference 400 (i.e., that results in an NA≥0.4) provides a much improved bend uniformity for optical fiber bends that are greater than 5 mm diameter. If a given bend diameter is less than the bend uniformity diameter, then the light emitted via the sides of the fiber will be increasingly non-uniform. Thus, there is a tradeoff that can be exploited by designers to optimize the bend loss improvement while trading off other aspects of the design such as cost as lower refractive index coating materials that will give a larger difference 400 are more expensive. As described below, the core region depicted in FIG. 2 can include both nano-structured regions 26 and non-nano-structured regions 22 and 28 (not shown in this view).

The glass portions (20, 40-1) of the optical fiber 12 can be made using standard optical fiber processing methods. For example, in one embodiment, an outside vapor deposition (OVD) process is employed to implement a chemical vapor deposition of low density silica soot (0.25 to 1.0 g/cc). The low density silica soot is sintered in a consolidation step. During the consolidation step, pockets or bubbles of non-soluble gas are trapped (N2, Ar, Kr, SO2) in the glass matrix. As described herein, subsequent laydown and consolidation steps can be performed to build the desired core structure. To be specific, a core structure that includes both silica regions and nano-structured silica can be implemented in this manner. The design of the core 20 is chosen as a mix between nano-structured region 26 and non-nano-structured silica (22, 28) to allow for different intrinsic levels of overall scattering. Specifically, the design will provide more nano-structures to increase the level of scattering.

In the next step, the inner cladding 40-1 is formed by depositing a predetermined volume of soot (in accordance with the desired thickness of the cladding 40-1). The soot is consolidated in the presence of a Fluorine precursor such as SiF4 to build the fluorine doped cladding material (F-doped cladding 40-1).

The consolidated preform is taken to draw where it is heated and stretched into a fiber. The glass fiber portion can have a diameter that is in the range of 50 to 600 µm. In some applications, the diameter range is between 80-250 µm. If the application calls for the use of epoxy-cured optical fiber connectors, then the diameter of the glass portion of fiber 12 will typically be 125 µm. Additional control over the scattering level of the fiber can be achieved at draw by modifying the thermal history of the glass. For example, a higher temperature draw will cause additional coalescence of nano-structures leading to greater level of scattering from the same preform.

In some embodiments of the fiber 12, core 20 is a graded-index core, and the refractive index profile of the core has a parabolic (or substantially parabolic) shape; in some embodiments, e.g., the refractive index profile of core 20 has an α-shape with an α value of about 2, and in some cases between 1.8 and 2.3 as measured at 850 nm. In other embodiments, one or more segments of the refractive index profile have a substantially step index shape with an α value greater than 8, and in some cases greater than 10, or greater than 20, as measured at 850 nm. In some embodiments, the refractive index of the core may have a centerline dip, wherein the maximum refractive index of the core, and the maximum refractive index of the entire optical fiber, is located a small distance away from centerline 16, but in other embodiments the refractive index of the core has no centerline dip, and the maximum refractive index of the core, and the maximum refractive index of the entire optical fiber, is located at the centerline.

In the next step, a polymer cladding 40-2 is formed over the glass cladding portion 40-1. The polymer cladding layer 40-2 can be implemented by an F-doped acrylate material or as a silicone coating. Those skilled in the art of fiber making will recognize that any polymeric material that has a depressed index relative to the glass that can be coated onto a bare fiber will work. Common examples include Teflon™, Silicones and F-doped acrylates. The polymer cladding material 40-2 is selected to have a predetermined refractive index that is less than the refractive index of the inner cladding 40-1. (See FIG. 2). The polymer cladding material 40-2 has a secondary function of providing a selected bend resistance depending on the configuration and arrangement of the optical fiber within the luminaire. (See FIG. 8). A material that has a relatively low refractive index usually exhibits a better bend resistance than materials that have a relatively high refractive index; but the low refractive index materials typically cost more. The thickness of the polymer cladding 40-2 is selected to provide the desired amount of optical guidance. The polymer cladding material can have a thickness within the range of 5 to 30 µm. In certain embodiments, the polymer cladding has a thickness of about 15 µm. The F-doped acrylate material may be implemented using any suitable low refractive index material that is employed for fiber cladding applications, e.g., PC404AP, which is provided by SSCP Co., Ltd., or Luvantix Co.

After the optical fiber 12 shown in FIG. 2 is formed, then one or more optional coatings can be applied. The fiber can be coated with a suitable standard telecom grade coating, such as those provided by Momentive Performance Materials, Inc., for example. The primary function of the optical coating is to physically protect the fiber 12. The standard telecom grade coating can have a thickness within the range of 10 to 100 µm. In certain embodiments, the polymer cladding has a thickness of between about 20-25 µm. A diffusing coating with light scattering structures or nano-particles can also be applied around the standard telecom grade coating. The nominal thickness of this coating is about 2.5 µm. One of the advantages of the process described herein relates to the ability of the optical fiber 12 to be mated with epoxy-based connectors. See FIGS. 7A-7B.

Figure 3:
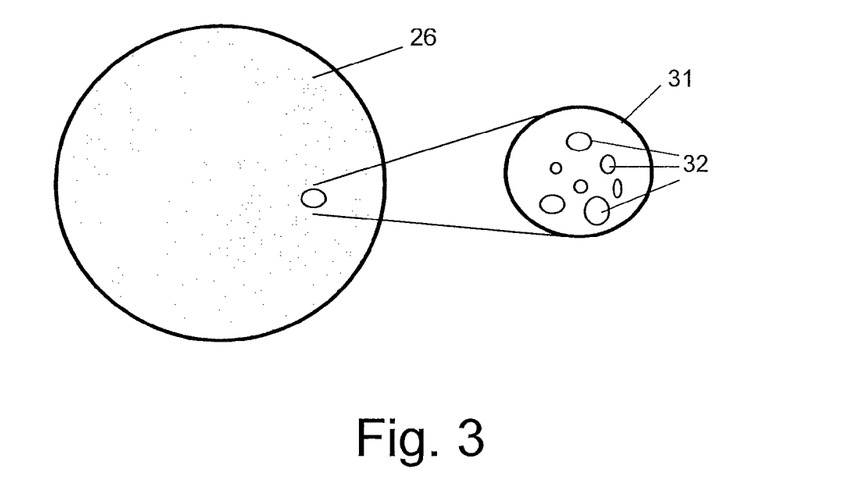
FIG. 3 is a detail schematic cross-section view of a core region for the fiber depicted in FIG. 2 in accordance with an embodiment.

Referring to FIG. 3, a detail view of a core region of the fiber depicted in FIG. 2 in accordance with an embodiment is disclosed. In this embodiment, the entire core region is comprised of an "nano-structured" material. Specifically, the core region 26 of light-diffusing fiber 12 comprises a glass matrix ("glass") 31 that has a plurality of non-periodically disposed nano-sized structures (e.g., voids or nano-particles) 32 situated therein, such as the example voids shown in detail in the magnified inset of FIG. 3. In another example embodiment, the nano-sized structures 32 may be periodically disposed, such as in a photonic crystal optical fiber, wherein the nano-sized structures typically have diameters between about $1\times10^{-6}$ m and $1\times10^{-5}$ m. The nano-sized structures 32 may also be non-periodically, or randomly, disposed in the material 31. In some exemplary embodiments, the glass matrix 31 is comprised of fluorine-doped silica, while in other embodiment the glass is undoped pure silica. The diameters of the nano-structures 32 are at least 10 nm.

The nano-sized structures 32 scatter the light away from the core 20 and toward the outer surface of the fiber 12. The scattered light is then "diffused" through the outer surface of the fiber 12 to provide the desired illumination. That is, a desired amount of the light is diffused (via scattering) through the sides of the fiber 12, along the fiber length. The fiber 12 can have a scattering-induced attenuation of greater than 50 dB/km in the wavelength(s) of the emitted radiation (illumination wavelength). The scattering-induced attenuation is greater than 100 dB/km for the wavelength of the light propagating in the core. In some embodiments, the scattering-induced attenuation is greater than 500 dB/km at this wavelength, and in some embodiments the scattering-induced attenuation can be, e.g., 1000 dB/km, greater than 2000 dB/km, or greater than 5000 dB/km. These high scattering losses are about 2.5 to 250 times higher than the Rayleigh scattering losses in standard single mode and multimode optical fibers.

Figure 4:
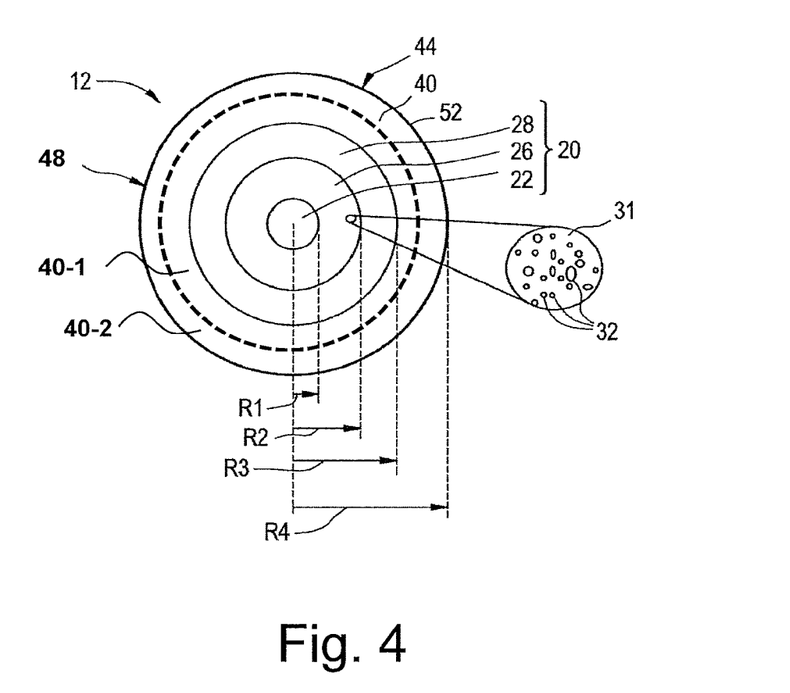
FIG. 4 is a detail schematic cross-section of the double clad light-diffusing fiber, illustrating another core region for the optical fiber depicted in FIGS. 1-2 in accordance with another embodiment.

Referring to FIG. 4, a schematic cross-section of the optical fiber 12 (as viewed along the section line 2-2 depicted in FIG. 1) in accordance with another embodiment is disclosed. In this embodiment, fiber 12 includes a core 20 divided into three regions. These core regions can be, for example: a solid (i.e. without nano-structures) central portion 22, a nano-structured ring region 26, and an outer solid portion 28 surrounding the inner annular core region 26. The glass disposed in the regions 22 and 28 can include updopants, such as Ge, Al, and/or P. As described herein, the cladding region 40 ("cladding") includes an inner glass cladding 40-1 and an outer polymer cladding 40-2 that surround the annular core 20. Comparing FIG. 3 to FIG. 4, therefore, a nano-structured region 26 may have a radius that is less than or equal to the core radius.

In some embodiments of fiber 12, core sections 22 and 28 comprise silica doped with germanium, i.e., germanium-doped silica. Dopants other than germanium, singly or in combination, may be employed within the core, and particularly at or near the centerline 16, of the optical fiber to obtain the desired refractive index and density. In at least some embodiments, the relative refractive index profile of the optical fiber disclosed herein is non-negative in core sections 22 and 28. In at least some embodiments, the optical fiber contains no index-decreasing dopants in the core. In some embodiments, the relative refractive index profile of the optical fiber disclosed herein is non-negative in sections 22 and 28. In some examples of fiber 12 as used herein, the core 20 comprises pure silica. In one embodiment, a preferred attribute of the fiber is the ability to scatter light out of the fiber (to diffuse light) in the desired spectral range to which biological material is sensitive. In another embodiment, the scattered light may be used for decorative accents and white light applications. The amount of the loss via scattering can be increased by changing the properties of the glass in the fiber, the width of the nano-structured region 26, and the size and the density of the nano-sized structures.

Like the previous embodiment, the core region 26 of light-diffusing fiber 12 comprises a glass matrix ("glass") 31 with a plurality of non-periodically disposed nano-sized structures (e.g., "voids" or particles) 32 situated therein, such as the example voids shown in detail in the magnified inset of FIG. 4. In another example embodiment, nano-structures 32 may be periodically disposed, such as in a photonic crystal optical fiber, wherein the nano-structures 32 typically have diameters between about $1 \times 10^{-6}$ m and $1 \times 10^{-5}$ m. The nano-structures 32 may also be non-periodically or randomly disposed in the material. In some exemplary embodiment, glass 31 in region 26 is fluorine-doped silica, while in other embodiment the glass is undoped pure silica. The diameters of the nano-structures 32 are at least 10 nm.

By "non-periodically disposed" or "non-periodic distribution," it is meant that when one takes a cross-section of the optical fiber (such as shown in FIG. 4), the nano-structures 32 are randomly or non-periodically distributed across a portion of the fiber. Similar cross sections taken at different points along the length of the fiber will reveal different cross-sectional nano-structure patterns, i.e., various cross sections will have different patterns, wherein the distributions of nano-structures and their sizes do not match. That is, the nano-structures 32 are non-periodic, i.e., they are not periodically disposed within the fiber structure. The nano-structures 32 can be stretched (elongated) along the length (i.e. parallel to the longitudinal axis) of the optical fiber, but do not extend the entire length of the entire fiber for typical lengths of transmission fiber. While not wishing to be bound by theory, it is believed that the nano-structures can extend less than 10 meters, and in many cases, extend less than 1 meter along the length of the fiber.

As described above, an optional coating 44 may surround the double-clad region 40. Coating 44 may include a low modulus primary coating layer and a high modulus secondary coating layer. In some embodiments, coating layer 44 comprises a polymer coating such as an acrylate-based or silicone based polymer. In other embodiments, the coating has a constant diameter along the length of the fiber. In some exemplary embodiments, coating 44 is designed to enhance the distribution and/or the nature of "radiated light" that passes through the double-clad region 40. The outer surface of the cladding 40, or the of the outer of optional coating 44, represents the "sides" 48 of fiber 12 through which light traveling in the fiber is made to exit via scattering, as described herein. A protective cover or sheath (not shown) optionally covers cladding 40.

Example Coating Materials

| Product Name | PC 363 AP | PC373 AP | PC 404AP |
| --- | --- | --- | --- |
| Cured Index 852 nm | 1.36 | 1.37 | 1.40 |
| Calc NA relative to fused silica @ 852 nm | 0.50 | 0.47 | 0.37 |
| Secant Modulus (Mpa) | 50 | 74 | 398 |
| Tensile Strength (MPa) | 5.2 | 7.85 | 16.5 |

Figure 5:
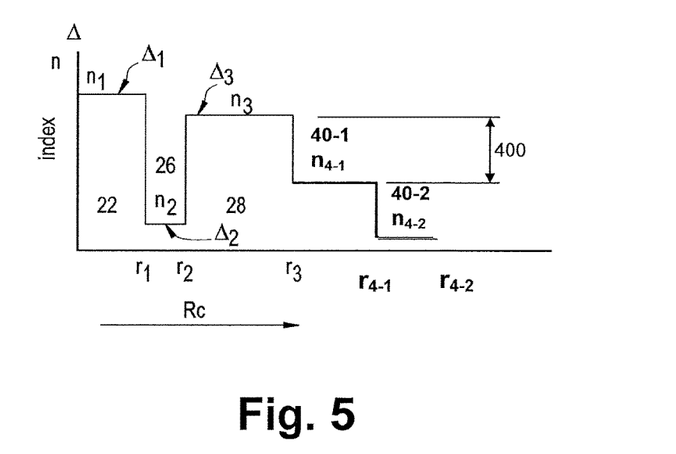
FIG. 5 is a schematic illustration of relative refractive index plot versus fiber radius for the double clad light-diffusing fiber depicted in FIG. 4.

Referring to FIG. 5, a schematic illustration of relative refractive index plot versus fiber radius for a light-diffusing fiber in accordance with an embodiment is disclosed. To be specific, FIG. 5 is a plot of the relative refractive index $\Delta$ versus fiber radius $R_c$. The core 20 may also have a graded core profile, characterized, for example, by an $\alpha$-value between 1.7 and 2.3 (e.g., 1.8 to 2.3). As shown, the core region 22 extends radially outwardly from the centerline to its outer radius, R1, and has a relative refractive index profile $\Delta_1(r)$ corresponding to a maximum refractive index n1 (and relative refractive index percent $\Delta_{1MAX}$). In this embodiment, the reference index $n_{REF}$ is the refractive index at the cladding. The second core region (nano-structured region) 26 has minimum refractive index n2, a relative refractive index profile $\Delta 2(r)$, a maximum relative refractive index $\Delta 2_{MAX}$, and a minimum relative refractive index $\Delta 2_{MIN}$, where in some embodiments $\Delta 2_{MAX} = \Delta 2_{MIN}$. The third core region 28 has a maximum refractive index n3, a relative refractive index profile $\Delta 3(r)$ with a maximum relative refractive index $\Delta 3_{MAX}$ and a minimum relative refractive index $\Delta 3_{MIN}$, where in some embodiments $\Delta 3_{MAX} = \Delta 3_{MIN}$. In this embodiment the inner-annular cladding 40-1 has a refractive index n4-1, a relative refractive index profile $\Delta 4\text{-}1(r)$ with a maximum relative refractive index $\Delta 4\text{-}1_{MAX}$, and a minimum relative refractive index $\Delta 4\text{-}1_{MIN}$. The outer-annular cladding 40-2 has a refractive index n4-2, a relative refractive index profile $\Delta 4\text{-}2(r)$ with a maximum relative refractive index $\Delta 4\text{-}2_{MAX}$, and a minimum relative refractive index $\Delta 4\text{-}2_{MIN}$. In some embodiments $\Delta 4\text{-}2_{MAX} = \Delta 4\text{-}2_{MIN}$. In some embodiments, $\Delta 1_{MAX} > \Delta 4\text{-}1_{MAX}$ and $\Delta 3_{MAX} > \Delta 4\text{-}1_{MAX} > \Delta 4\text{-}2_{MAX}$. In some embodiments $\Delta 2_{MIN} > \Delta 4\text{-}1_{MAX}$. In the embodiment shown in FIGS. 4 and 5, $\Delta 1_{MAX} > \Delta 3_{MAX} > \Delta 2_{MAX} > \Delta 4\text{-}1_{MAX} > \Delta 4\text{-}2_{MAX}$. In this embodiment the refractive indices of the regions have the following relationship n1>n3>n2>n4-1>n4-2.

According to the present invention, $\Delta 4\text{-}1_{MAX} > \Delta 4\text{-}2_{MAX}$ and n4-1>n4-2. Stated differently, the double-cladding region 40 is characterized by a stepped refractive index profile. The reason for this is as follows: a high NA cladding region provides for good light guiding under bending similar to prior disclosed embodiments. If that outermost layer is a glass, the level of down dopants available for incorporation in fused silica would limit the maximum achievable NA to <0.3 relative to a substantially pure silica cladding as compared to an achievable NA of >0.50 with a polymeric cladding. As disclosed above, coupling a fiber to a connector is made more difficult by the presence of a polymeric layer. The addition of a glass cladding enables light guidance via standard telecommunications connectors. The second cladding layer provides the necessary high NA for good bending performance. One embodiment has a first glass cladding with an NA of 0.16 relative to fused silica followed by a polymeric cladding with an NA of 0.50 relative to fused silica. When this fiber is "connectorized," i.e., coupled to an optical connector 100, the second cladding can be physically stripped from the fiber allowing direct gluing upon the glass of the 0.16 NA fiber into the connector. When light is coupled into the fiber with an NA of <0.16 it will be guided. It is also obvious to those skilled in the art that stripping to bare glass will also enable fusion splicing of the 0.16 NA fiber to a suitable fiber. Because a second cladding is provided away from the connector 100, the light does not leak out of the fiber and does not generate greater visible intensity at the region under bend. Instead, light propagated by the core will exit the primary glass cladding, but will be guided back into the core by the second cladding with the NA of 0.50. Briefly stated, the first cladding allows the fiber 12 to be easily coupled to an optical fiber whereas the second cladding provides improved resistance to bending losses. The numerical aperture (NA) of fiber 12 can be equal to, or greater than, the NA of a light source directing light into the fiber. The numerical aperture (NA) of fiber 12 can be greater than 0.2, in some embodiments greater than 0.3, and in others greater than 0.4. This allows the optical fiber 12 to be employed with more economical light sources such as LEDs.

In some embodiments, core regions 22, 28 without nano-structures have a substantially constant refractive index profile, as shown in FIG. 3A with a constant $\Delta 1(r)$ and $\Delta 3(r)$. In some of these embodiments, $\Delta 2(r)$ is either slightly positive ($0 < \Delta 2(r) < 0.1\%$), negative ($-0.1\% < \Delta 2(r) < 0$), or 0%. In other embodiments the absolute magnitude of $\Delta 2(r)$ is less than 0.1%, and can be substantially less than 0.05%. In yet other embodiments, the outer cladding region 40-2 has a substantially constant refractive index profile, as shown in FIG. 5, with a constant $\Delta 4(r)$. In some of these embodiments, $\Delta 4\text{-}2(r)=0\%$. The core section 22 has a refractive index where $\Delta 1(r) \geq 0\%$.

In some embodiments, nano-structured region 26 comprises a pure silica matrix 31 that is nano-structured to include a plurality of nano-structures 32 (voids or particles). The minimum relative refractive index and the average effective relative refractive index—taking into account the presence of any nano-structures—of nano-structured region 26 are both less than −0.1%. The voids 32 may contain one or more gases, such as argon, nitrogen, oxygen, krypton, or $SO_2$ or can contain a vacuum with substantially no gas. However, regardless of the presence or absence of any gas, the average refractive index in nano-structured region 26 is lowered due to the presence of nano-structures 32. The nano-structures 32 can be randomly or non-periodically disposed in the nano-structured region 26, and in other embodiments, the voids are disposed periodically therein. In some embodiments, the plurality of nano-structures 32 comprises a plurality of non-periodically disposed nano-structures and a plurality of periodically disposed nano-structures.

In some embodiments, the core outer radius $r_1$ of the first core region 22 is not less than 24 μm and not more than 50 μm, i.e. the core diameter is between about 48 and 100 μm. In other embodiments, $r_1 > 24$ microns; in still other embodiments, $r_1 > 30$ microns; in yet other embodiments, $r_1 > 40$ microns. In some embodiments, $|\Delta_2(r)| < 0.025\%$ for more than 50% of the radial width of the annular inner portion 26, and in other embodiments $|\Delta_2(r)| < 0.01\%$ for more than 50% of the radial width of region 26. The depressed-index annular portion 26 begins where the relative refractive index of the cladding first reaches a value of less than −0.05%, going radially outwardly from the centerline.

Figure 6A:
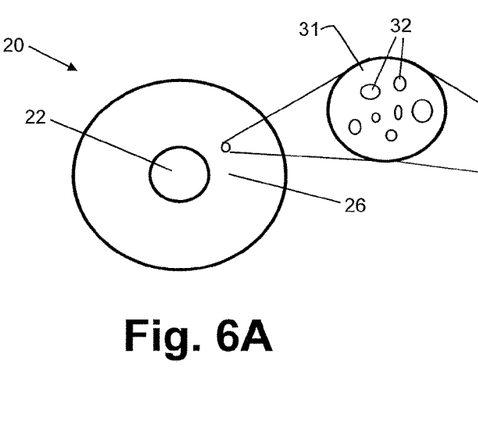
FIGS. 6A-6B are detail schematic cross-section view of a core region for the fiber depicted in FIG. 2 in accordance with other embodiments.
Figure 6B:
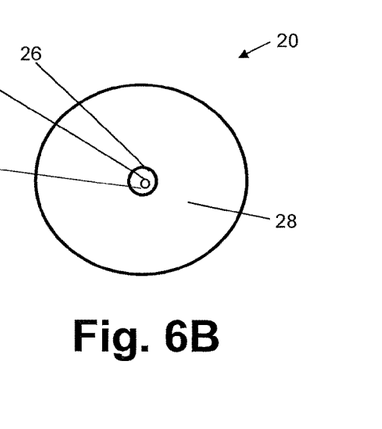

Referring to FIGS. 6A-6B, detail views of the core region of the fiber depicted in FIG. 1 in accordance with other embodiments of the present invention are disclosed. In FIG. 6A, the core 20 includes a central core portion 22 that is surrounded by a nano-structured portion 26. FIG. 6B on the other hand, features a nano-structured central core portion 26 that is surrounded by a solid non-nano-structured portion 28. The characteristics of the nano-structured portions and the solid portions are described in detail above. Namely, the nano-engineered regions include voids or features that are configured to scatter the light propagating in the fiber. The portions 22, 28 without nano-structures may be comprised of pure silica. As before, the core region sections 22 and 28 may comprise silica doped with germanium, i.e., germanium-doped silica. Dopants other than germanium, singly or in combination, may be employed within portions 22, 28, and particularly at or near the centerline 16, of the optical fiber to obtain the desired refractive index and density.

Figure 7A:
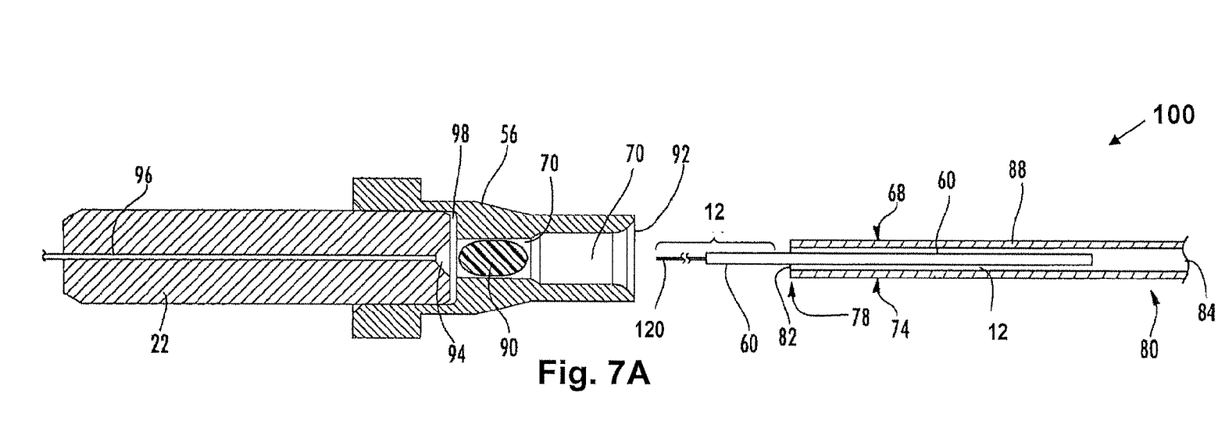
FIGS. 7A-7B are cross-sectional views of a connector employed to terminate the optical fibers in accordance with an embodiment.
Figure 7B:
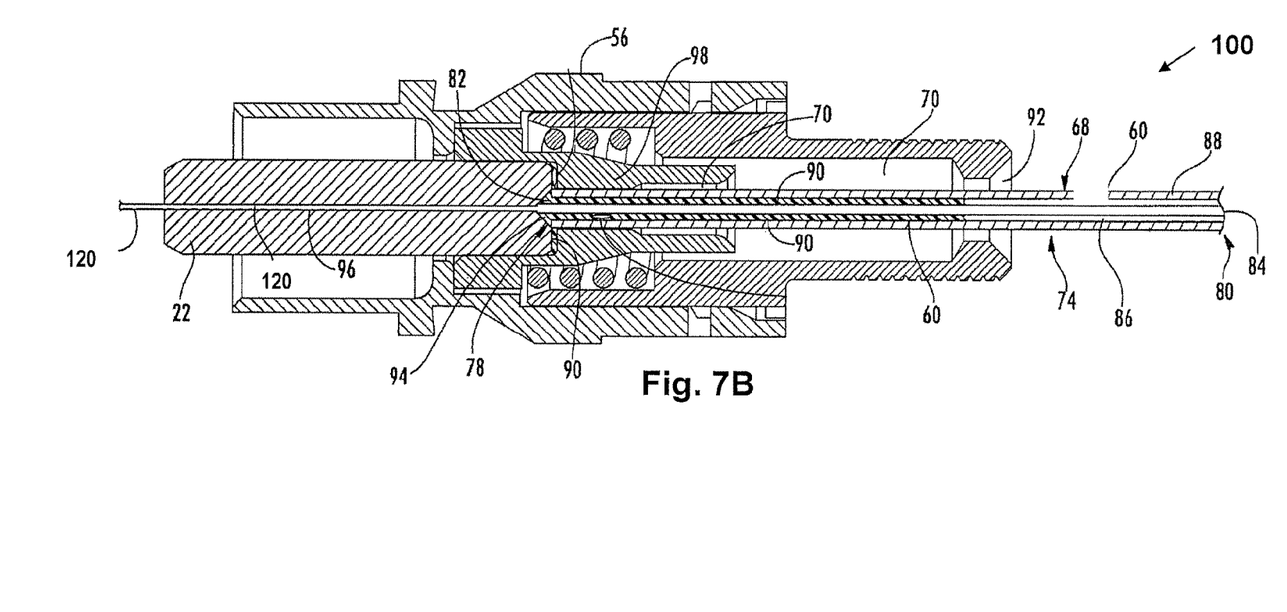

Referring to FIGS. 7A-7B, cross-sectional views of a connector portion 100 employed to terminate the optical fibers in accordance with an embodiment of the present invention are disclosed. To be clear, FIGS. 7A-7B are a stylized illustrations of an LC connector 100 available from Corning optical communications, LLC under the product name Heat-Cure Connector, LC, part number 95-252-LC-BP. Those skilled in the art will appreciate, however, that any suitable epoxy based connector 100 may be employed in the present invention.

Referring to FIG. 7A, the double-clad fiber 12 is disposed in a tube 68 that has a cylindrical-shaped and substantially hollow tube body 74 comprised of a tube wall 76. Tube body 74 of tube 68 is cut on each end 78, 80 such that orifices 82, 84 are exposed on each of the ends 78, 80. Of course, the tube 68 has a larger internal diameter than the outer diameter of the coated portion 60 of optical fiber 12 so that the tube 68 can be inserted over optical fiber 12.

In the method of FIG. 7A, the outer cladding 40-2, the coating(s) 60 and ink layers are stripped from the end of optical fiber 12 (to form a bare portion 120) before inserting the same into ferrule holder 70. To be clear, the bare portion 120 of the optical fiber 12 includes the core portion 20 and the inner F-doped glass cladding portion 40-1. Specifically, a portion of the outer polymer coating 40-2 (as well as the outer coatings 60) are removed and not inserted into the ferrule bore 96. A bonding agent 90, such as a curable epoxy of other suitable bonding agent, is placed inside a portion of ferrule holder passage 70 before optical fiber 12 and the tube 68 disposed thereabout are inserted. After curing, bonding agent 90 secures stiffener tube 68 and/or optical fiber 12 inside the ferrule holder passage 70 of connector subassembly. Bonding agent 90 is injected using a suitable device such as a needle inserted into ferrule holder passage 70. Thereafter, optical fiber 12 and supporting stiffener tube 68 are inserted into ferrule holder passage opening 92 and into the ferrule holder passage 70.

By way of example, the outer diameter of the tube 68 may be about 900 micrometers (μm) and the inner diameter may be about 380 micrometers (μm). The outer diameter of the coated portion 60 of optical fiber 12 may have a nominal diameter of about 250 micrometers (μm), and consists of the core 20 and the inner-cladding 40-1 of the optical fiber 12 having an outer diameter of about 125 micrometers (μm), and a coating adding another approximately 125 micrometers (μm), and may optionally include an added outer ink layer adding another approximately three to four additional micrometers (μm). Because the inner diameter of stiffener tube 68 is larger than the outer diameter of the coated portion 60 of optical fiber 12, an interstitial space 86 is formed by the space between an inner surface 88 of stiffener tube 68 and the outer surface of optical fiber 12. This interstitial space 86 allows stiffener tube 68 to move and retract (i.e., slide) about optical fiber 12 during assembly before stiffener tube 68 is bonded to optical fiber 12 inside ferrule holder passage 70. Stiffener tube 68 is slid onto the end of optical fiber 12 such that the bare portion 120 of optical fiber 12 is exposed outside of stiffener tube 68. Stiffener tube 68 is movable along the optical fiber 12 so that the end 80 of stiffener tube 68 is inserted into fiber optic cable 20. For instance, during assembly end 80 of stiffener tube 68 may extend into a buffer tube of fiber optic cable 20 that is filled with a thixotropic grease or gel, thereby inhibiting gas trapped within stiffener tube 68 from escaping.

FIG. 7B is a cross-section view of the connector 100 sub-assembly with the tube 68 and optical fiber 12 inserted into the ferrule holder passage 70 and into bonding agent 90. The end 78 of the tube 68 is inserted into ferrule holder passage 70 and abuts funneled opening 94. As optical fiber 12 and tube 68 disposed thereabout are extended into ferrule holder passage 70, both will encounter and be inserted through the bonding agent 90. In this manner, bonding agent 90 will surround the tube 68 and optical fiber 12 carried therein as illustrated herein. The bonding agent 90 will also extend into the interstitial space 86 inside the tube 68 and around and inside a funneled lead-in opening 94 (also referred to as "funneled opening 94") leading to a ferrule bore 96 that extends to a front face of ferrule 22. Bonding agent 90 will surround optical fiber 12 and stiffener tube 68 inside ferrule holder passage 70 and funneled opening 94 to secure optical fiber 12 and/or stiffener tube 68 within the connector sub-assembly 16. The initial diameter of the funneled opening 94 is typically designed to be slightly larger than the outer diameter of the tube 68. Thus, the tube 68 inserted inside the funneled opening 94 will align the tube 68 to the ferrule bore 96. However, the reduced diameter of the funneled opening 94 prevents the tube 68 from extending into ferrule bore 96. Only the bare portion 120 of optical fiber 12 can therefore enter into ferrule bore 96. Because the tube 68 has a greater inner diameter than the optical fiber 12, it tends to move about optical fiber 12 and the bare portion 120 of optical fiber 12 will extend into ferrule bore 96. Briefly stated, the tube 68 remains abutted against or slightly inside funneled opening 94, while the tube 68 allows the bare fiber portion 120 of optical fiber 12 to extend into and through ferrule bore 96.

Figure 8A:
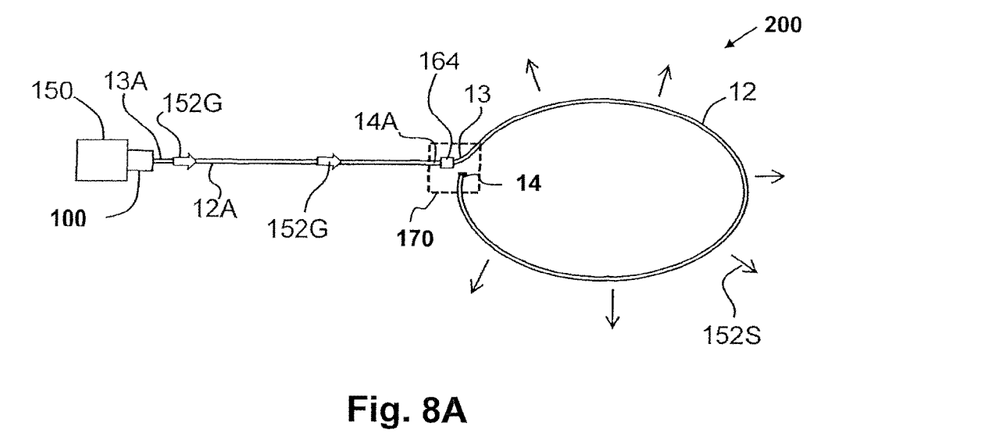
FIGS. 8A-8B are diagrammatic depictions of luminaires in accordance with an embodiment.
Figure 8B:
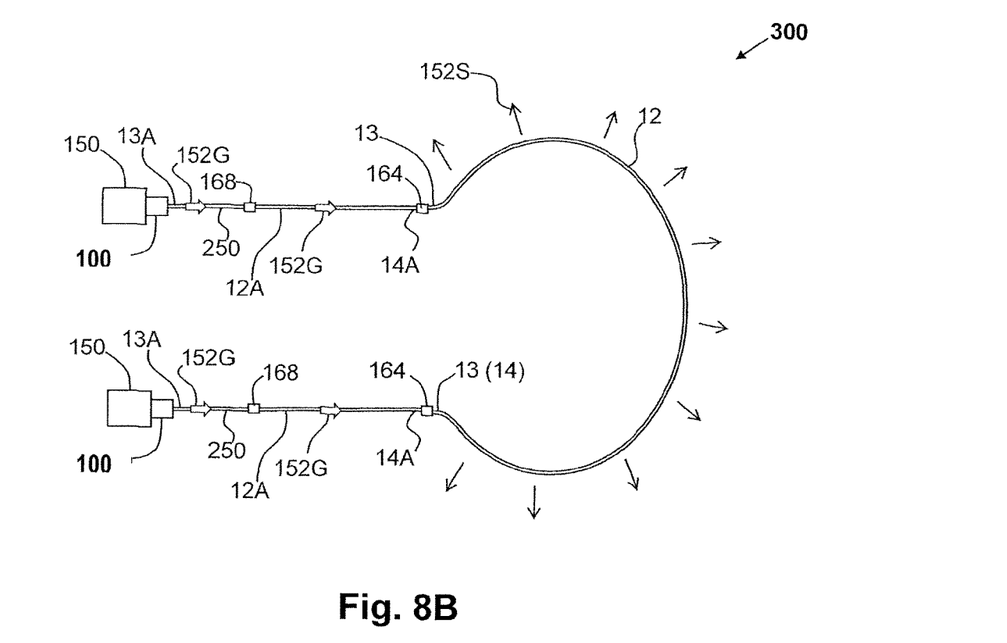

Referring to FIGS. 8A-8B, diagrammatic depictions of luminaires 200 in accordance with an embodiment of the invention are disclosed. While these drawings are stylized, i.e., they depict the optical fiber 12 as being configured as a simple loop, the reader will appreciate that the luminaire 200 may be configured to conform to any suitable shape to implement any number of signage or specialty lighting configurations. Specifically, the optical fiber light source 12 within luminaire 200 is thin, flexible, and easily modified to a variety of different shapes such as human readable indicia (letters, numbers, symbols, etc.), visual scenes, automotive lighting, architectural lighting (e.g., illuminating plate glass, glass blocks, wall washing fixtures, etc.). Briefly stated, the luminaire system 200 includes at least one light source 150 that generates light having at least one wavelength between 200 nm and 2000 nm. The light source may be implemented using lasers, laser diodes or LED light sources.

Turning now to FIG. 8A, the luminaire 200 includes a low-scatter light-conducting optical fiber 12A that is optically coupled to the light source 150 at one end 13A via the optical fiber connector 100 described above. The low-scatter light-conducting optical fiber 12A has another end 14A that is optically coupled to an input end 13 of the double-clad light-diffusing optical fiber 12 using, for example, a splicing member 164. The light-diffusing optical fiber 12 extends to an interface region 170 that may be configured in a variety of ways. In one embodiment, the interface region 170 may simply terminate the end of the optical fiber. In another example, the interface region 170 is configured to include a mirror that is optically coupled to the end 14 of light-diffusing optical fiber 12. In yet another example, the interface region 170 is configured to include an optical isolator disposed and arranged in the low-scatter light-conducting optical fiber 12A to prevent scattered light 152S, or guided light 152G, from returning to light source 150, e.g., by reflection by the mirror.

In operation, the light source 150 emits light 152 that travels in optical fibers 12A and 12 as guided light 152G. Guided light 152G that travels in light-diffusing optical fiber 12 scatters out of the fiber as scattered light 152S. Light-diffusing optical fiber 12 can be configured as a wound coil or can be configured as any reasonable shape.

Turning now to FIG. 8B, another example embodiment of an illumination system 300 is disclosed. System 300 includes two light sources 150 that are coupled to respective sections of low-scatter light-conducting optical fiber 12A via the optical connectors 100 described herein. The light sources 150 are configured to provide counter-propagating guided light 102G that generates scattered light 152S in light-diffusing optical fiber 12 so that colors can be made move along the length of the optical fiber 12. As before, the optical fiber 12 is shown as being arranged in a simple loop configuration. As before, that the optical fiber 12 disposed within system 300 is thin, flexible, and easily modified to a variety of different shapes such as human readable indicia (letters, numbers, symbols, etc.), visual scenes, automotive lighting, architectural lighting (e.g., illuminating plate glass, glass blocks, wall washing fixtures, etc.).

By employing the epoxy-based optical connector 100 and the double-clad fiber 12 described herein, the costs associated with both the hardware and the assembly of systems 200, 300 can be reduced significantly. Moreover, the performance and reliability of systems (200, 300) is significantly improved because of the robust nature of the interconnections (12, 100). Specifically, when the optical fiber 12 is terminated by the connector 100, the optical cladding must remain intact in the connector 100 so that the fiber can adequately guide light. By removing the outer optical plastic cladding 40-2, the inner glass cladding 40-1 can be firmly and robustly terminated by the connector 100 so that the light can be accurately guided through connector 100. Because epoxy-based connectors 100 are standard fiber optic technology developed for fibers with glass cladding, the reliability and performance of luminaires 200 featuring light diffusing fiber 12 is significantly improved while dramatically reducing costs.

Moreover, because of the double-clad arrangement described herein, the light diffusing fiber 12 and an attached connector 100 can be used in an illumination or decorative lighting systems 100 that feature a plurality of fiber bends while maintaining a substantially uniform brightness (because of the presence of the outer polymer cladding 40-2 which remains intact in all areas away from the connector 100).

The present invention thus combines the benefits that come with the reliable, robust and inexpensive epoxy-based connectors 100 (typically used in all-glass fiber applications) and the bendability (due to high NA) of low index plastic clad fibers. Briefly stated, the unique optical fiber of the present invention maximizes the benefits from both technologies while obviating—or significantly mitigating—their disadvantages.

It will be apparent to those skilled in the art that various modifications and variations can be made without departing from the spirit or scope of the claims.

What is claimed is:

1. A method comprising:
    providing an optical fiber that includes a glass core region having a first end and a second end characterized by a core radius, the glass core region including at least one nano-structured region disposed within at least one predetermined radial segment between the first end and the second end, the at least one nano-structured region including nano-sized structures configured to scatter light propagating in the glass core region such that the glass core region has an average refractive index $n_{avg}$, the at least one nano-structured region being characterized by a nano-structured region radius that is less than or equal to the core radius, the optical fiber also including an interior glass cladding region surrounding the glass core region, the interior glass cladding region having an interior cladding refractive index $n_2$ that is less than $n_{avg}$, the optical fiber further including an outer polymeric cladding region surrounding the interior glass cladding region, the outer cladding region having an outer cladding refractive index $n_3$ less than $n_2$, a refractive index difference of $n_2-n_3$ corresponding to a bend uniformity diameter, wherein the light exiting the outer cladding at a fiber bending location is substantially non-uniform when a bending diameter of the fiber bending location is less than the bend uniformity diameter;
    providing an optical fiber connector including a ferrule portion having a ferrule bore length;
    removing a portion of the outer polymeric cladding region, the portion of the outer cladding region having a length substantially corresponding to the ferrule bore length; and
    inserting a portion of the optical fiber a predetermined distance into the ferrule bore, the predetermined distance substantially corresponding to the length of the removed portion of the outer polymer cladding region such that only the glass core region and the interior glass cladding region are disposed within the ferrule.

2. The method of claim 1, further comprising the step of inserting a curable epoxy into the ferrule bore to secure the portion of the optical fiber within the ferrule bore.

3. The method of claim 1, wherein a diameter of the glass core region and the interior glass cladding region is substantially equal to about 125 µm.

4. The method of claim 1, wherein the interior glass cladding region is doped with Fluorine, and wherein the polymeric material is selected from a group of polymeric materials that include a Fluorine doped acrylate material, a silicone material, or a Teflon material.

5. A luminaire comprising:
    a light-scattering optical fiber that includes a glass core region having a first end and a second end characterized by a core radius, the glass core region including at least one nano-structured region disposed within at least one predetermined radial segment between the first end and the second end, the at least one nano-structured region including nano-sized structures configured to scatter light propagating in the glass core region such that the glass core region has an average refractive index $n_{avg}$, the at least one nano-structured region being characterized by a nano-structured region radius that is less than or equal to the core radius, the fiber includes an interior glass cladding region surrounding the glass core region, the interior glass cladding region having an interior cladding refractive index $n_2$ that is less than $n_{avg}$, the fiber also includes an outer polymer cladding region surrounding the interior glass cladding region, the outer polymer cladding region having an outer cladding refractive index $n_3$ less than $n_2$, a refractive index difference of $n_2-n_3$ corresponding to a bend uniformity diameter, wherein the light exiting the outer polymer cladding at a fiber bending location is substantially non-uniform when a bending diameter of the fiber bending location is less than the bend uniformity diameter; and
    a light source coupled to the optical fiber and configured to direct the light into the optical fiber, the light being scattered by the nano-sized structures and emitted via the outer polymer cladding region.

6. The luminaire of claim 5, further comprising an optical fiber connector coupled to the optical fiber, the optical fiber connector including a ferrule portion having a ferrule bore length, a portion of the optical fiber being disposed in the ferrule bore and secured therein with a curable epoxy.

7. The luminaire of claim 5, wherein a diameter of the glass core region and the interior glass cladding region is substantially equal to about 125 µm.

8. The luminaire of claim 5, wherein the light is characterized by at least one wavelength substantially within a range between 200 nm and 2000 nm.

9. The luminaire of claim 5, wherein the light source includes at least one LED, at least one laser, or at least one laser diode.

* * * * *